(12) United States Patent
Meydani et al.

(10) Patent No.: US 6,642,259 B1
(45) Date of Patent: Nov. 4, 2003

(54) IMMUNE STIMULATING DIETARY SUPPLEMENT AND METHOD OF USE THEREOF

(75) Inventors: Simin Nikbin Meydani, Newton, MA (US); Mohsen Meydani, Newton, MA (US)

(73) Assignee: Trustees of Tufts College, Medford, MA (US)

(*) Notice: Subject to any disclaimer, the term of this patent is extended or adjusted under 35 U.S.C. 154(b) by 0 days.

(21) Appl. No.: 09/979,535

(22) PCT Filed: May 5, 2000

(86) PCT No.: PCT/US00/12300
§ 371 (c)(1),
(2), (4) Date: Mar. 25, 2002

(87) PCT Pub. No.: WO00/67596
PCT Pub. Date: Nov. 16, 2000

Related U.S. Application Data
(60) Provisional application No. 60/133,101, filed on May 7, 1999.

(51) Int. Cl.$^7$ .............................................. A61K 31/44
(52) U.S. Cl. ...................... 514/345; 514/19; 514/249; 514/52; 424/643; 424/702; 424/630
(58) Field of Search .................... 514/345, 25, 19, 514/249, 52; 424/643, 702, 630

(56) References Cited

U.S. PATENT DOCUMENTS

| | | | | |
|---|---|---|---|---|
| 4,282,265 | A | | 8/1981 | Theuer ........................ 426/607 |
| 4,629,625 | A | | 12/1986 | Gaull .......................... 424/145 |
| 4,981,844 | A | | 1/1991 | Alexander et al. ............. 514/21 |
| 5,380,752 | A | | 1/1995 | Monte ......................... 514/474 |
| 5,470,839 | A | | 11/1995 | Laughlin et al. ............... 514/53 |
| 5,556,644 | A | * | 9/1996 | Chandra ...................... 424/630 |
| 5,561,160 | A | * | 10/1996 | Walaszek et al. ............ 514/574 |
| 5,674,901 | A | | 10/1997 | Cook et al. .................. 514/558 |
| 5,814,663 | A | | 9/1998 | Cook et al. .................. 514/560 |
| 6,420,342 | B1 | * | 7/2002 | Hageman et al. .............. 514/23 |
| 6,444,700 | B1 | * | 9/2002 | DeMichele et al. .......... 514/474 |
| 6,479,545 | B1 | * | 11/2002 | Levinson et al. ............ 514/560 |
| 2001/0031744 | A1 | * | 10/2001 | Kosbab ........................ 514/54 |
| 2002/0098274 | A1 | * | 7/2002 | Fimreite et al. ............. 426/601 |

FOREIGN PATENT DOCUMENTS

| | | |
|---|---|---|
| EP | 0 596 717 A1 | 11/1993 |
| WO | WO 92/21368 A | 12/1992 |
| WO | WO 97/46118 | 12/1997 |

OTHER PUBLICATIONS

Ma, D.W.L., et al., "Preparation of Conjugated Linoleic Acid From Safflower Oil", *J of the Am. Oil Chemists Society*, 76(6): 729–730 (1999).

"1989 Recommended Dietary Intakes", Retrieved from the Internet (Sep. 25, 2000): XP002148324, <URL:http://www.nal.usda.gov/fnic/dga/rda.pdf>.

Miller, R.A., "Aging and Immune Function," *Exp. Gerontal*, 29:21–35 (1994).

Meydani, S.N., et al., "Vitamin E Supplementation Suppresses Prostaglandin E1/2 Synthesis and Enhances the Immune Response of Aged Mice," *Mech. Ageing and Develop.*, 34:191–201 (1986).

Furakawa, T, et al., "Reversal of Age–Associated Decline in Immune Responsiveness by Dietary Glutathione Supplementation in Mice," *Mech. Ageing and Develop.*, 38:107–117 (1987).

Meydani S.N., et al., "Fish Oil and Tocopherol–Induced Changes in Natural Killer Cell–Mediated Cytotoxicity and $PGE_2$ Synthesis in Young and Old Mice," *J. Nutr.*, 118(10):1245–1252 (1988).

Meydani S.N., et al., "Effect of Vitamin E Supplementation on Immune Responsiveness of Aged," *Ann. NY Acad. Sci.*, 570:283–290 (1989)

Meydani S.N., et al., "Effect of Vitamin $B_6$ on the Immune Response of Healthy Elderly," *Ann. NY Acad. Sci.*, 587:303–306 (1990).

Meydani S.N., et al., "Vitamin E Supplementation Enhances Cell–Mediated Immunity in Healthy Elderly," *Am. J. Clin. Nutr.*, 52:557–563 (1990).

Meydani S.N., et al., "Vitamin B–6 Deficiency Impairs Interleukin 2 Production and Lymphocyte Proliferation of Elderly Adults," *Am. J. Clin. Nutr.*, 53:1275–1280 (1991).

Kowdley K.V., et al., "Vitamin E Deficiency and Impaired Cellular Immunity Related to Intestinal Fat Malabsorption," *Gastroenterology*, 102(6):2139–2142 (1992).

Wu D., et al., "In Vitro Glutathione Supplementation Enhances Interleukin–2 Production and Mitogenic Response of Peripheral Blood Mononuclear Cells from Young and Old Subjects," *J. Nutr.*, 124:655–663 (1994).

Beharka, A.A., et al., "Macrophage prostaglandin production contributes to the age–associated decrease in T cell function which is reversed by the dietary antioxidant vitamin E," *Mech. Ageing and Dev*.93:59–77 (1997).

Meydani, S.N., et al., "Vitamin E Supplementation and In Vivo Immune Response in Healthy Elderly Subjects: A Randomized Controlled Trial," *JAMA*, 277(17): 1380–1386 (1997).

Hayek, M.G., et al., Vitamin E Supplementation Decreases Lung Virus Titers in Mice Infected with Influenza, *J. Infect. Diseases*, 176(1): 273–276 (1997).

(List continued on next page.)

*Primary Examiner*—James H. Reamer
(74) *Attorney, Agent, or Firm*—Hamilton, Brook, Smith & Reynolds, P.C.

(57) ABSTRACT

The immune system of middle aged and elderly individuals is stimulated with a dietary supplement. The dietary supplement includes Vitamin E, Vitamin B6 and conjugated linoleic acid. The dietary supplement can further include glutathione alone or in combination with Vitamin C, folic acid, zinc, selenium, Vitamin D, copper and Vitamin B12. The dietary supplement is administered to middle aged and elderly individuals in a suitable form for consumption by the individual. Suitable forms of consumption can include a snack bar, tablet, capsule, powder, drink, or dairy products.

31 Claims, 4 Drawing Sheets

OTHER PUBLICATIONS

Hayek, M.G., et al., "Dietary conjugated Linoleic Acid Influences the Immune Response of Young and Old C57BL/6NCrBR Mice," *Am. J. Nutri.*,129(1): 32–38 (1999).

Han, S.N., et al., Vitamin E (E) Supplementation Increase Splenocyt IL–2 and IFN–γ Production of Old Mice Infected with Influenza Virus, *FASEB J*, 12:A819 (1998).

Meydani S.N. et al., "Nutrition and the immune function in the elderly." In: *Human Nutrition: A Comprehensive Treatise*, vol. VII J. Munro and D. Danforth, eds. (NY: Plenum Press), pp. 61–87 (1989).

Meydani, S.N. et al., "Beneficial Effects of Dietary Antioxidants on the Aging and Immune System." In: *Oxygen and Free Radicals in Biology and Medicine*, M.G. Simic et al., eds., (NY: Plenum Press), pp. 621–625, 1989.

Furukawa, T. et al.,"The Potential Benefits of Dietary Glutathione on Immune Function and Other Practical Implications." In: *Glutathione: Metabolism and Physiological Functions*, J. Viña ed. (Boca Raton, FL: CRC Press), pp. 351–358 (1990).

Meydani, S.N., et al., "Influence of Vitamins E and $B_6$ on Immune Response." In: *Beyond Deficiency, New Views on the Function and Health Effects of Vitamins*, H.E. Sauberlich adn L.J. Machlin eds., (NY: The New York Academy of Sciences) pp. 125–140 (1992).

Meydani, S.N., et al., "Antioxidants and immune response in aged persons: overview of present evidence," *Am. J. Clin. Nutr.*, 62(Suppl): 1462S–76S (1995).

Chavance, M., et al., "Does Multivitamin Supplementation Prevent Infections in Healthy Elderly Subjects? A Controlled Trial," *Internat. J. Vit. Nutr. Res.* 63:11–16 (1993).

Kennes, B., et al., "Effect of Vitamin C Supplements on Cell–Mediated Immunity in Old People," *Gerontology* 29:305–310 (1983).

Penn, N.D., "The Effect of Dietary Supplementation with Vitamins A, C and E on Cell–mediated Immune Function on Elderly Long–stay Patients: A Randomized Controlled Trial," *Age and Ageing* 20:169–174 (1991).

Murphy, Sean, et al., "Impact of Vitamin A Supplementaion on the Incidence of Infection in Elderly Nursing–home Residents: A Randomized Controlled Trial," *Age and Ageing* 21:435–439 (1992).

Chandra, R.K., "Effect of vitamin and trace–element supplemenation on immune responses and infection in elderly subject," *The Lancet* 340:1124–1127 (1992).

Chandra, R.K., "Nutrition and Immunity in the Elderly," *Nutrition Reviews* 50(12):367–371 (1992).

Preziosi, P., et al., "Effects of Supplementation with a Combination of Antioxidant Vitamins and Trace Elements, at Nutritional Doses, on Biochemical Indicators and Markers of the Antioxidant system in Adult Subjects," *Journal of the American College of Nutrition* 17(3):244–249 (1998).

Monget, AL, et al., "Effect of 6 month supplementation with different combinations of an association of antioxidant nutrients on biochemical parameters and markers of the antioxidant defence system in the elderly," *European Journal of Clinical Nutrition* 50:443–449 (1996).

Roebothan, B.V. et al., "Relationship between Nutritional Status and Immune Function fo Elderly People," *Age and Ageing* 23:49–53 (1994).

Pike, J. et al., "Effect of Vitamin and Trace Element Supplementation on Immune Indices in Healthy Elderly," *Internat. J. Vit. Nutr. Res.* 65:117–121 (1995).

Chandra, R.K., "Nutrition and the immune system: an introduction," *Am J Clin Nutr* 66:460S–463S (1997).

Chandra, R.K., "Graying of the Immune System," *JAMA* 277(17):1398–1399 (1997).

Chandra, R.K., "Nutrition and Immunity," *Recenti Progressi in Medicina* 79(7–8):305–309 (1988).

Chandra, R.K., "Designer Formulas for Boosting Immunity," *Nutrition* 6(1):121 (1990).

Chandra, R.K., "The Relation between Immunology, Nutrition and Disease in Elderly People," *Age and Ageing* 19:S25–S31 (1990).

Rosenberg, I.H., "Concluding Remarks," In *Nutritional Assessment of Elderly Populations: Measure and Function*, I.H. Rosenberg, et al., eds. (NY: Raven Press), pp. 304–306 (1995).

Chandra, R.K., "Influence of Nutrition on Immunocompetence in the Elderly." In *Nutrient Modulation of the Immune Response*, S.Cunningham–Rundles, eds. (NY: Marcel Dekker, Inc.), pp. 455–465 (1993).

Chandra, R.K., et al., "Nutritional support improves antibody response to influenza virus vaccine in the elderly," *British Medical Journal* 291:705–706 (1985).

Herbeth, B., et al., "Vitamin Status, Immunity and Infections in the Elderly," *Nutrition and Immunology*:226–237 (1992).

Chin, S.F., et al., "Dietary Sources of Conjugated Dienoic Isomers of Linoleic Acid, a Newly Recognized Class of Anticarcinogens," *J Food Comp and Anal* 5:185–197 (1992).

* cited by examiner

IMMUNE STIMULATING DIETARY SUPPLEMENT AND METHOD OF USE THEREOF

RELATED APPLICATIONS

This application claims the benefit of U.S. Provisional Application Serial No. 60/133,101, filed May 7, 1999, the entire teachings of which are incorporated herein by reference.

GOVERNMENT SUPPORT

This invention was made with Government support under 58-1950-9-001 awarded by the United States Department of Agriculture. The Government has certain rights in the invention.

BACKGROUND OF THE INVENTION

Immune responses gradually decline with increasing age. Coincident with a decline in immune responses is a concomitant increase in the incidence of tumor development, infection and inflammatory diseases in middle aged and elderly populations of individuals. ("Fundamental Immunology" ed. W.E. Paul, Raven Press, NY (1989); Miller, R. A., *Exp. Gerontol.* 29:21–35 (1994). Compromised nutritional status can contribute to the impaired immunological state and, hence, declining health of aging individuals. Thus, there is a need to develop convenient and effective methods that augment the nutritional requirements of middle aged and elderly individuals, thereby stimulating the immune system to combat disease.

SUMMARY OF THE INVENTION

The present invention relates to a dietary supplement. It also is directed to a method to stimulate the immune system of middle aged and elderly individuals or to stimulate proliferation of a lymphocyte by administration of the dietary supplement.

In one embodiment, the dietary supplement comprises Vitamin E, Vitamin B6 and conjugated linoleic acid. In a specific embodiment, the dietary supplement includes Vitamin E in an amount in a range of between about 10 milligrams and about 267 milligrams per milligram of Vitamin B6, and conjugated linoleic acid in an amount in a range of between about 17 milligrams and about 100 milligrams per milligram of Vitamin B6. In another specific embodiment, the dietary supplement further includes glutathione Vitamin C, folic acid, zinc, selenium, Vitamin D, copper, Vitamin B12 and glutathione. Preferably, the dietary supplement includes Vitamin C in an amount in a range of between about 17 milligrams and about 200 milligrams per milligram of Vitamin B6; folic acid in an amount in a range of between about 0.05 milligrams and about 0.2 milligrams per milligram of Vitamin B6; zinc in an amount in a range of between about 1.67 milligrams and about 10 milligrams per milligram of Vitamin B6; selenium in an amount in a range of between about 0.005 milligrams and about 0.02 milligrams per milligram of Vitamin B6; Vitamin D in an amount in a range of between about 0.0008 milligrams and about 0.005 milligrams per milligram of Vitamin B6; copper in an amount in a range of between about 0.00008 milligrams and about 0.0007 milligrams per milligram of Vitamin B6; Vitamin B12 in an amount in a range of between about 0.0002 milligrams and about 0.001 milligrams per milligram of Vitamin B6; and glutathione in an amount in a range of between about 4 milligrams and about 33 milligrams per milligram of Vitamin B6.

in another embodiment, the dietary supplement comprises about 60–800 IU of Vitamin E (such as d-α-tocopherol, dl-α-tocopheryl acetate, dl-α-tocopheryl); about 3–6 mg of Vitamin B6; and about 100–300 mg of conjugated linoleic acid. In another embodiment, the dietary supplement is administered to a middle aged or elderly individuals.

In another embodiment, the dietary supplement further includes about 25–100 mg of glutathione (such as γ-glutamylcysteinylglycine) alone, or in combination with about 100–600 mg of Vitamin C; about 300–600 μg of folic acid; about 10–30 mg of zinc; about 30–60 μg of selenium; about 5–15 μg of Vitamin D; about 0.5–2 μg of copper; and about 1–3 μg of Vitamin B12.

In yet another embodiment, the invention is a method of stimulating the immune system of an individual comprising formulating the dietary supplement and administering the dietary supplement to the individual.

In still another embodiment, the invention is a method of stimulating the proliferation of lymphocytes comprising formulating the dietary supplement and administering the dietary supplement to the lymphocytes. In a preferred embodiment, T-lymphocytes (T-cells) are stimulated to proliferate.

The invention described herein provides an alternative and improved dietary supplement that can conveniently be used to stimulate immune responses in middle aged and elderly individuals. Thus, administration of the dietary supplement of the present invention can potentially prevent infection-mediated diseases and tumor formation as a result of compromised immune function in individuals, in particular middle aged and elderly individuals.

DETAILED DESCRIPTION OF THE INVENTION

The features and other details of the invention, either as steps of the invention or as combinations of parts of the invention, will now be more particularly described and pointed out in the claims. It will be understood that the particular embodiments of the invention are shown by way of illustration and not as limitations of the invention. The principle features of this invention can be employed in various embodiments without departing from the scope of the invention.

The present invention relates to the discovery that a dietary supplement can stimulate the immune system of middle aged and elderly individuals. In particular, the dietary supplement of the invention stimulates the function of and proliferation of T-lymphocytes (T-cells) of middle aged and elderly individuals. The phrase "dietary supplement" is used interchangeably herein with the phrase "nutrient mixture."

In one embodiment, the dietary supplement comprises Vitamin E, Vitamin B6 and conjugated linoleic acid. In a specific embodiment, the dietary supplement includes Vitamin E in an amount in a range of between about 10 milligrams and about 267 milligrams per milligram of Vitamin B6, and conjugated linoleic acid in an amount in a range of between about 17 milligrams and about 100 milligrams per milligram of Vitamin B6. In another specific embodiment, the dietary supplement further includes glutathione Vitamin C, folic acid, zinc, selenium, Vitamin D, copper, Vitamin B12, and glutathione. Preferably, the dietary supplement includes Vitamin C in an amount in a range of between about 17 milligrams and about 200 milligrams per milligram of Vitamin B6; folic acid in an amount in a range of between about 0.05 milligrams and about 0.2 milligrams per milligram of Vitamin B6; zinc in an amount in a range of between about 1.67 milligrams and about 10 milligrams per milligram of Vitamin B6; selenium in an amount in a range of between about 0.005 milligrams and about 0.02 milligrams per milligram of, Vitamin B6; Vitamin D in an amount in a range of between about 0.0008 milligrams and about 0.005 milligrams per milligram of Vitamin B6; copper in an amount in a range of between about 0.00008 milligrams and about 0.0007 milligrams per milligram of Vitamin B6; Vitamin B12 in an amount in a range of between about 0.0002 milligrams and about 0.001 milligrams per milligram of Vitamin B6; and glutathione in an amount in a range of between about 4 milligrams and about 33 milligrams per milligram of Vitamin B6.

in another specific embodiment, the dietary supplement comprises about 60–800 IU of Vitamin E; about 3–6 mg of Vitamin B6; and about 100–300 mg of conjugated linoleic acid. In another embodiment, the dietary supplement further includes about 25–100 mg of glutathione alone or in combination with about 100–600 mg of Vitamin C; about 300–600 $\mu$g of folic acid; about 10–30 mg of zinc; about 30–60 $\mu$g of selenium; about 5–15 $\mu$g of Vitamin D; about 0.5–2 $\mu$g of copper; and about 1–3 $\mu$g of Vitamin B12.

The dietary supplement is formulated by blending the components (e.g., Vitamin E, Vitamin B6, conjugated linoleic acid, glutathione) to produce a mixture. In a particular embodiment, Vitamin E is d-α-tocopherol, dl-α-tocopheryl acetate or dl-α-tocopheryl and glutathione is γ-glutamylcysteinylglycine. Methods to mix the components of the dietary supplement can include, for example, the addition of components of relatively lower concentration or quantity (e.g., selenium, copper) to components of relatively higher concentration or quantity (e.g., Vitamin C, conjugated linoleic acid, glutathione). The dietary supplement can be stored at ambient temperature (e.g., 18–25° C.) or at cooler temperatures, for example, in a refrigerator (e.g., 4° C.).

In one embodiment, the dietary supplement is formulated by blending Vitamin C, Vitamin B6, zinc, folic acid, selenium, copper, Vitamin D, Vitamin B12 and glutathione to prepare a stock mixture of the dietary supplement. The fat soluble components, Vitamin E and conjugated linoleic acid, are then .added to the stock mixture prior to use (e.g., in vitro addition to lymphocytes). In another embodiment the dietary supplement is formulated by simultaneously blending all of the components in any order.

As defined herein, a "middle aged" individual refers to an individual who is at an age between about 40% to about 60% of the expected lifespan of the individual. For example, a middle-aged human individual is a human between the age of about 45 to about 65 years old. Likewise, a middle-aged C57BL/6NCrlBr mouse is a mouse about 14 to about 16 months of age. An "elderly" individual refers to an individual who is an age in a range of between about 65% to about 100% of the expected lifespan of the individual. For example, an elderly human individual is a human greater than about 65 years of age. Similarly, an elderly C57BL/6NCrlBr mouse is a mouse greater than about 16 months of age, such as a mouse of about 24 months of age.

The term "individual" is used to refer to any mammal. For example, the mammal can be a primate mammal (e.g., human, monkey, baboon) domesticated mammal (e.g., dog, cat), ruminant mammal (e.g., cow, sheep, horse) or rodent mammal (e.g., mouse, rat, guinea pig). In particular, the dietary supplement is used to stimulate the immune system of human mammals. It is also envisioned that the dietary supplement can be used in veterinary practice to stimulate the immune system of other mammals such as dogs and cats.

In a method of the invention, the dietary supplements are administered to middle aged and elderly individuals to stimulate the immune system. The supplement is administered to the individuals by a means suitable, for consumption, such as a tablet or capsule which can be easily swallowed, chewed, or dissolved. Additionally, or alternatively, the dietary supplement can be formulated into a powder or liquid for convenient addition to drinks, baked goods, dairy products or other food stuffs. The dietary supplement can also be consumed in the form of a snack bar, drink or lozenge. The supplement preferably is consumed on a daily basis, e.g., once a day. The dietary supplement can also be consumed multiple (greater than one) times a day.

The term "stimulate", as used herein, refers to any augmentation, increase, or enhancement of an immunological indice in the individual following consumption of the dietary supplement. In a preferred embodiment, the dietary supplement stimulates T-lymphocytes (also referred to herein as T-cells) function. In a particularly preferred embodiment, T-lymhphocyte proliferation is the stimulated immune response.

Optionally, stimulation of the immune system of the individual being administered the dietary supplement can be monitored. Methods to assess immune system stimulation are routine and well known to those skilled in the art. For example, indices of immune stimulation can be assessed in peripheral blood samples obtained from individuals consuming the dietary supplement by monitoring the proliferation of phytohemagglutinin-(PHA) or concanavalin A(ConA)-stimulated lymphocytes. Additionally, or alternatively, the levels of immunoglobulins (e.g., IgA, IgG and IgM), antibody titers against known, vaccines or antigens, concentrations and synthesis of cytokines (e.g., IL-2) and the number and type of leucocytes (e.g., polymorphonuclear or mononuclear) can be determined in peripheral blood samples. Methods to assay immune stimulation can also include evaluations of delayed-type hyper-sensitivity skin responses, resistance to infections diseases, natural killer cell activity, or any combination thereof. Exemplary techniques to assess immune system stimulation can be found, for example, in Kennes, B., et al., *Gerontology* 29:305–310 (1983); Meydani, S. N., et al., *Mech. Aging and Develop.* 34:191–201, (1986); Meydani, S. N., et al., *Ann. N.Y. Acad. Sci.* 570:283–290, (1989); Meydani, S. N., et al., *Am J. Clin, Nutr.* 52:557–563, (1990); Meydani, S. N., et al., Am. J Clin. Nutr. 53:1275–1280 (1991); Wu, D., et al., J Nutr. 124:655–663, (1994); Meydani, S. N., et al., JAMA 277:1380–1386 (1997); Hayek, M; G., et al., J Infect. Dis. 17:273–276 (1997), the teachings of all of which are hereby incorporated by reference in their entirety).

Immune responsive indices following treatment with the dietary supplement of the invention can be compared with indices prior to treatment: If necessary, the dose and frequency of administration of the dietary supplement can be increased to further stimulate the immune system. Similarly, the dose and frequency of administration of the dietary supplement can be decreased following stimulation of the immune system (e.g., T-lymphocyte proliferation).

In another embodiment, the invention is a method of stimulating the proliferation of lymphocytes. The dietary supplement is formulated and administered to the lymphocytes (e.g., T-lymphocytes, B-lymphocytes). In a preferred embodiment, T lymphocytes are stimulated to proliferate. Stimulation of T-lymphocytes is a well recognized indice of T-lymphocyte function, Beharka, A., et al., Methods in Enzymology 282:247–263 (1997); "Fundamental Immunlogy", ed. W. E. Paul, Raven Press, NY (1989); "Methods in Cellular Immunology", ed. Fernandez, R., et al., CRC Press, Boca Raton. Fla. (1995), the teachings of all of which are hereby incorporated by reference in their entirety. T-lymphocytes can be stimulated to proliferate by the methods of the invention, for example, by stimulating proliferation in a mammal in vivo following consumption of the dietary supplement. Similarly, T-lymphocytes can be obtained from the mammal (e.g., from the spleen or peripheral blood) and exposed to the dietary supplement in vitro to stimulate proliferation; this stimulation can be an assessment of the effect of the dietary supplement on T-lymphocyte function in vivo. T-lymphocytes obtained from the mammal can be a population or collection of cells which consist essentially of T-lymphocytes, or a population of cells that consist of T-lymphocytes as well as other cell types (e.g., B-lymphocytes, fibroblast, red blood cells). Suitable methods to assess T-cell proliferation are well known to one of skill in the art (See, for example, Wu, et al., J Nutr. 128:193–197 (1998)), the teachings of which are hereby incorporated by reference in its entirety).

The present invention is further illustrated by the following examples, which are not intended to be limiting in anyway.

EXAMPLE 1

In Vitro Effects of the Nutrient Mixture on Cells Isolated from aged Animals

Materials and Methods:

A stock mix for use in in vitro experiments was formulated by blending the components in the units and order as listed in Table 1. RPMI 1640 media (Bio Whitaker, Walkerville, Md.) was used to prepare the stock mixture and for dilution of components added to the stock mixture (vitamin E and conjugated linoleic acid). The stock mixture was stored at ambient temperature (e.g., 18–25° C.). For in vitro experiments, the stock mixture was prepared fresh prior to dilution in RPMI 1640 media.

TABLE 1

Composition of the Stock Mixture for In Vitro Experiments

| Component | Units |
|---|---|
| Vitamin C | 500 mg |
| Vitamin B6 | 5 mg |
| Zinc | 20 mg |
| Folic Acid | 500 µg |
| Selenium | 50 µg |
| Copper | 14 µg |
| Vitamin D | 10 µg |
| Vitamin B12 | 1 µg |
| Glutathione | 25 mg |

The stock mixture was dissolved in RPMI 1640 media to prepare a solution containing 12.5 milligrams of the stock mixture per milliliter of RPMI 1640 media. For example, 62.5 mg of the stock mixture was dissolved in 5 ml of RPMI 1640 media which was then serially diluted to prepare a 12.5 microgram of the stock solution per milliliter of RPMI 1640. The concentrations of each component in a 12.5 µg/ml of the stock mixture in RPMI 1640 media are listed in Table 2.

A stock solution of conjugated linoleic acid (1mg/ml) was prepared by dissolving 25 µl of a 20 mg conjugated linoleic acid per ml stock solution in 475 µl of RPMI 1640 media. A 2.5 µg/ml solution was then prepared by adding 50 µl of the 1mg/ml solution to 19.95 ml of RPMI 1640 media.

Vitamin E (d-α-tocopherol) was prepared as a 0.5 µg/ml solution. Initially a 2 mg/ml stock solution was prepared by dissolving 29.4 µl of a d-α-tocopherol stock (34 mg/ml) into 471.6 µl of fetal bovine serum (FBS). Fetal bovine serum was used in these experiments since in vivo vitamin E is incorporated into serum lipoproteins before it can be delivered to cells. Fetal bovine serum contains lipoproteins, therefore it is used as a vehicle to deliver vitamin E to cells in in vitro splenocyte cultures. The vitamin E dissolved in fetal bovine serum was incubated at 37° C. for fifteen minutes to allow incorporation of vitamin E into the fetal bovine serum lipoproteins. Following the incubation, a 5 µg/ml solution of vitamin E was prepared by dissolving 50 µl of a 2 mg/ml solution into 19.95 ml of RPMI 1640.

TABLE 2

Units of Each Component in a 12.5 µg/ml of the Stock Mixture for In Vitro Experiments

| Component | Units µg/ml |
|---|---|
| Vitamin C | 11.89 |
| Vitamin B6 | 0.1189 |
| Zinc | 0.4756 |
| Folic Acid | 0.0119 |
| Selenium | 0.00119 |
| Copper | 0.000034 |
| Vitamin D | 0.00024 |
| Vitamin B12 | 0.000024 |
| Glutathione | 0.59460 |

The mixture listed in Table 2 was supplemented with conjugated linoleic acid and vitamin E so that the concentrations of each of the components in the nutrient mixture added to cells in vitro were as listed in Table 3. For example, 5 ml of the mixture in Table 2 (12.5 µg/ml) was admixed with 2.5 ml of vitamin E (5 µg/ml stock solution) and 2.5 ml of conjugated linoleic acid (2.5 µg/ml stock solution).

TABLE 3

Concentration of Nutrients Added to Cells in In Vitro Cultures

| Component | Units μg/ml | Units (ng/nd) Added to Cell Cultures (1 × 10⁶ cells/ml) |
|---|---|---|
| Vitamin C | 5.945 | 2378 |
| Vitamin B6 | 0.0594 | 23.76 |
| Zinc | 0.2378 | 95.12 |
| Folic Acid | 0.00595 | 2.38 |
| Selenium | 0.000595 | 0.238 |
| Copper | 0.000017 | 0.0068 |
| Vitamin D | 0.00012 | 0.048 |
| Vitamin B12 | 0.000012 | 0.0048 |
| Glutathione | 0.297301 | 118.92 |
| Vitamin E | 0.625 | 250 |
| Conjugated linoleic acid | 0.312 | 124.8 |

Aged (24 months of age) C57BL/6NCrlBR mice (n=6) were used in these experiments. The mean life span of a C57BL6 mouse is about 28 months. Aged mice were fed a commercial chow diet of Commercial Rodent Diet, Teklad 7012 (Teklad, Madison, Wis.).

Splenocytes were obtained from aged mice, cultured in the presence or absence of the nutrient mixture and their ability to proliferate in response to the T cell mitogen, Con was determined as previously described (See, for example, Wu, et al., *J Nutr.* 128:193–197 (1998), the teachings of which are hereby incorporated by reference in their entirety). Briefly, mice were euthanized with $CO_2$ asphyxiation, and their spleens were removed aseptically and placed in sterile RPMI 1640 media (Bio Whitaker, Walkerville, Md.) supplemented with 25 mM HEPES/L, 2mM glutamine/L, $1 \times 10^5$ units penicillin/L and 100 mg streptomycin/L.

A 100 μl aliquot of the mixture in the concentrations listed in Table 3 was added to 100 μl aliquot of splenocyte cell cultures ($2.5 \times 10^6$ ml cells) and incubated for four hours. The nutrient mixture was diluted 1/1; 1/2.5; 1/5 and 1/10 (volume:volume) with RPMI 1640 culture medium.

After the four hour incubation (37° C., 5% $CO_2$ and 95% humidity), Con A (1.5 mg/L of RPMI 1640 medium) was added to splenocyte cultures. Con A and PHA only stimulate T cells to proliferate ("Fundamental Immunology", ed. W. E. Paul, Raven Press, NY (1989); "Methods in Cellular Immunology", eds. Fernandez, R., et al., CRC Press, Boca Raton, Fla. (1995), the teachings of both of which are hereby incorporated by reference in their entirety)., Therefore, the proliferative response to Con A and PHA is referred to as a T-cell mediated response. The cells were cultured for an additional 72 hours (37° C.). Con A and PHA were used in these experiments because lymphocytes from aged mice and humans have been shown to have a significantly lower proliferative response to the T cell mitogens ConA and PHA (Miller, R. A., *Exp. Gerontol.* 29:21–35 (1994), the teachings of which are hereby incorporated by reference in its entirety). In addition, a mitogenic response induced by ConA is used as a measure of T cell function (Beharka, A., et al., *Methods its Enzymology* 282:247–263 (1997), the teachings of which are hereby incorporated by reference in their entirety).

After 68 hours of the 72 hour culture period, [³H]-thymidine (18.5 micro Bq) was added to culture media. After 4 hours of incubation with [³H]-thymidine, cells were harvested onto glass fiber filter mats by a TOMTEC harvester. Cell proliferation (also referred to as a proliferative response) was defined as the amount of [³H] thymidine incorporation into DNA over the 4 hour period as measured by liquid scintillation counting in a 1205 BETAPLATE counter. The BETAPLATE counter had an efficiency of more than 50% for ³H. Data were expressed as counts per minute (cpm). Counts per minute was calculated as the cpm of mitogen-stimulated cultures minus the cpm of cultures without mitogen. The counts per minute were expressed as the mean ±SEM.

Figure 1:
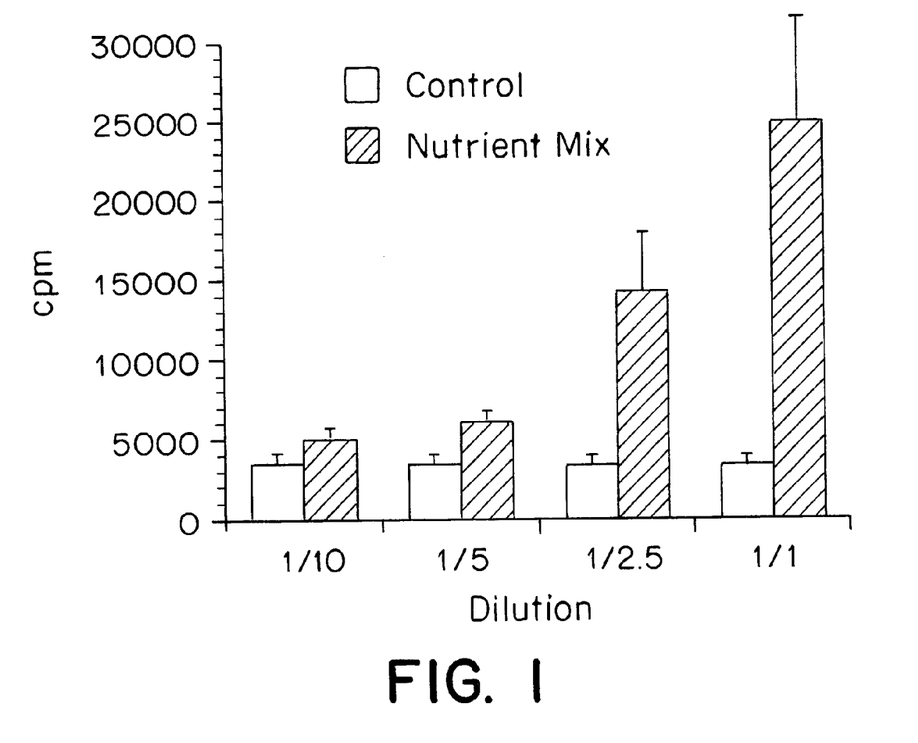
FIG. 1 illustrates the effect of varying dilutions ($\frac{1}{10}$; $\frac{1}{5}$; $\frac{1}{2.5}$; $\frac{1}{1}$) of the nutrient mixture on Conacavalin A-stimulated splenocyte proliferation in cells isolated from aged C57BL/6 mice.

Results:

As shown in FIG. 1, the in vitro addition of nutrient mixture to in vitro cultured splenocytes obtained from aced mice significantly increased the proliferative response of T cells to the mitogen ConA. Splenocytes obtained from aged mice and incubated in the nutrient mixture proliferated 5 fold more in response to ConA stimulation (at 1/1 dilution) than splenocytes cultured in the absence of the nutrient mixture (control). An increased proliferation of T-lymphocytes in response to Con A indicated a measure of improvement in the immune response.

The effect of the nutrient mixture on splenocyte proliferation and, thus, the immune response of cells was dose dependent. As the nutrient mixture was diluted, the proliferative response of splenocytes decreased (FIG. 1). Since proliferation of T cells in response to ConA has been shown to be significantly reduced in aged mice and humans (Miller, R. A., *Exp. Gerontol* 29:21–35 (1994), the teachings of which are incorporated herein in their entirety), these results show that the nutrient mixture can significantly improve the immune response in the aged mammal.

EXAMPLE 2

Feeding the Nutrient Mixture to aged Mice Significantly Improved T Cell Mediated Function Materials and Methods Specific Pathogen-Free young male (5 months old) and aged male (24 months old) C57BL/6NCrlBR mice were randomly assigned to a diet containing the National Research Council (NRC)-recommended level of all nutrients (control diet) or the control diet supplemented with the nutrient mixture. The composition of the control diet was based on AIN 93 (Reeves, P.G., et al, *J. Nutri* 123: 1939–1951 (1993), the teachings of which are hereby incorporated by reference in its entirety). The components and the concentration of components in the control diet and diet supplemented with the nutrient mixture are shown in Table 4. The concentration of the components in the nutrient mixture fed to mice are listed in Table 4.

The average caloric intake of a human is about 2100 Kcal per day (Recommended Daily Allowance, RDA). The average caloric intake of a mouse is about 13.84 Kcal per day. The 13.84 Kcal per day caloric intake is equivalent to about 3.8 g of food in a mouse diet per day. (Meydani, S. N., et al., *J. Nutr.* 121:547–555 (1991), the teachings of which are incorporated herein in their entirety). For example, in a human the amount of Vitamin E in a formula is 200 International Units (IU) (See Table 4) for a 2100 Kcal diet. To calculate the "mouse equivalent" dose or the amount to be added to a mouse diet to give a comparable amount of Vitamin E based on the 13.84 Kcal per daily caloric intake of a mouse the following calculations were employed:

$$\frac{200 \ IU \ \text{Vitamin} \ E \times 13.84 \ \text{Kcal}}{2100 \ \text{Kcal}} =$$

$$1.318 \ IU \ \text{Vitamin} \ E \ \text{for a 13.84 Kcal diet of a mouse}$$

Since 13.84 Kcal of an average caloric intake in the mouse is equivalent to about 3.8 grams of a mouse diet (also referred to as food), the amount of Vitamin E added per kg (1000g) of mouse food was calculated as follows:

$$\frac{1.318 \; IU \; \text{Vitamin} \; E \times 1000 \; g}{3.8 \; g} = 347 \; IU \; \text{Vitamin} \; E \; \text{per kg of food}$$

Employing the above strategy, the nutrient mixture was prepared containing the concentrations of each component as listed in Table 4. An amount of the mixture was admixed with and stirred into the control diet to achieve the concentrations listed in Table 4. Food and water were provided ad libitum to the mice.

TABLE 4

Components in a Human Diet, Mouse Diet and Diet Fed to Mice in In vivo Experiments the Nutrient Mixture.

| Component | Human Units/day | Mouse Units/kg diet | Control Diet Units/kg diet | Control Diet Supplemented With the Nutrient Mixture Units: IU/kg food or mg/kg food |
|---|---|---|---|---|
| Vitamin E | 200 IU | 347 IU* | 30 IU | 377 IU |
| Vitamin B6 | 5.0 mg | 8.6 mg | 7.0 mg | 15.67 mg |
| Conjugated linoleic acid | 100 mg | 174 mg | 0 | 174.00 mg |
| Glutathione | 25 mg | 44 mg | 0 | 44.0 mg |
| Vitamin C | 500 mg | 868 µg | 0 | 868.00 mg |
| Folic Acid | 500 µg | 87 µg | 2.0 mg | 2.87 mg |
| Zinc | 20 mg | 34.8 mg | 57.8 mg | 92.60 mg |
| Selenium | 50 µg | 87 µg | 358.7 mg | 358.787 mg |
| Vitamin D | 10 µg | 17.4 µg | 0.0173 mg | 0.0347 mg |
| Copper | 1.4 µg | 2.4 µg | 10.5 mg | 10.50243 mg |
| Vitamin B12 | 1 µg | 1.74 µg | 0.025 mg | 0.02674 mg |

*dl-α-tocopheryl acetate

Mice were randomly divided into three treatment groups. Group I mice (n=12) were young mice (5 months of age) fed a control diet. Group II mice (n=12) were aged mice (24 months old) who were fed a control diet for 4.5 weeks. Group II mice are also referred to as aged control mice. Group III mice (n=12) were aged mice (24 months) who were fed a control diet supplemented with the nutrient mixture. Group III mice were also referred to as aged nutrient mice. Group II and III aged mice were fed either the control or the diet supplemented with the nutrient mixture, respectively, for 4 ½ weeks.

Mice were individually housed in filtered cages in an environmentally controlled atmosphere (temperature 23° C., 45% relative humidity) with fifteen air changes of 100% fresh-filtered air per hour and a 12/12-hour light-dark cycle. Mice were weighed weekly.

Food intake was recorded daily. Food intake was calculated by subtracting the weight of left over food in each cage (one mouse per cage) from the food provided. Specialized food containers, which restrict food spillage, were used to reduce the loss of food due to digging.

To harvest splenocytes mice were euthanized by $CO_2$ asphyxiation and spleens excised aseptically. Single splenocyte cell suspensions were prepared and cultured for lymphocyte proliferation as described in Example 1 using established procedures (See, for example, Wu, et al., *J. Nutr.* 128:193–197 (1998), the teachings of which are hereby incorporated by reference in their entirety). Details of culture conditions were similar to those described in Example 1, except the nutrient mixture was not added to in vitro cultures.

Figure 2:
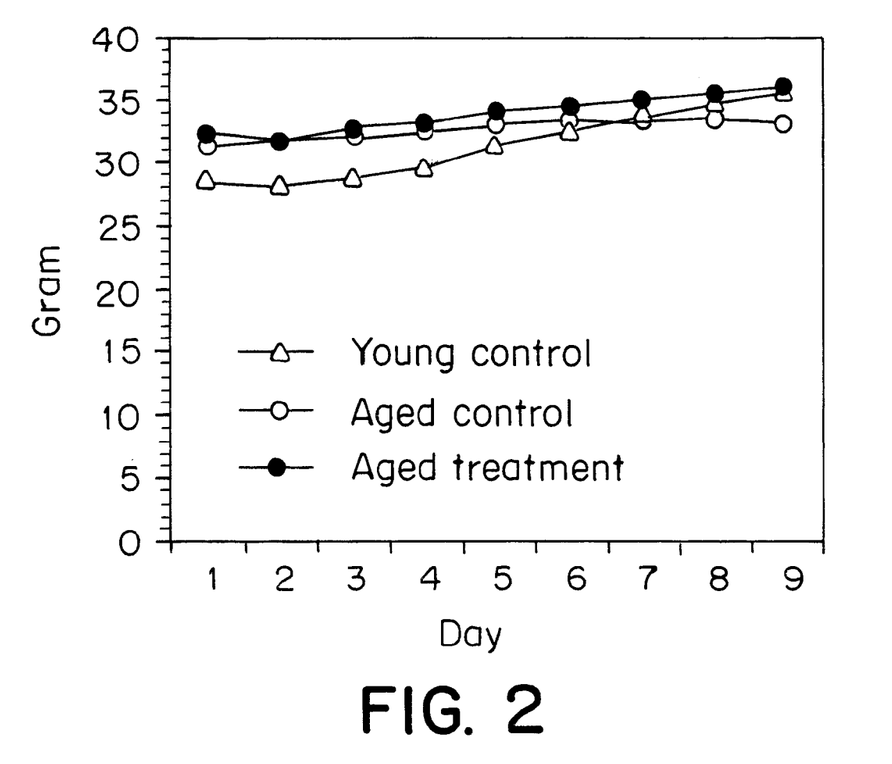
FIG. 2 depicts the body weight (grams) of young mice fed a control diet (young control - - - × - - - ), aged mice fed a control diet (aged control - - - ○ - - - ) and aged mice fed the nutrient mixture (aged treatment - - - ● - - - ).

Results:

As shown in FIG. 2, there was no difference in weight gain between the treatment groups.

Mice in all the treatment groups consumed about 3.8 g of food per day. There was no difference in food intake between aged mice fed a control diet or a supplemented diet or young mice fed a control diet.

Based on the daily food intake of about 3.8 g per day, Table 5 depicts about the concentration of each nutrient consumed by mice in each of the treatment groups.

TABLE 5

Dietary Intake of Nutrients.

| Component | Units (mg) Group III | Units (mg) Groups I and Group II |
|---|---|---|
| Vitamin E* | 1.4326* | 0.114* |
| Vitamin B6 | 0.059 | 0.0266 |
| Conjugated linoleic acid | 0.661 | 0 |
| Glutathione | 0.167 | 0 |
| Vitamin C | 3.298 | 0 |
| Folic Acid | 0.011 | 0.0076 |
| Zinc | 0.352 | 0.21964 |
| Selenium | 1.3634 | 1.3631 |
| Vitamin D | 0.000132 | 0.00007 |
| Copper | 0.03991 | 0.03990 |
| Vitamin B12 | 0.0001016 | 0.000095 |

*dl-α-tocopheryl acetate

Figure 3:
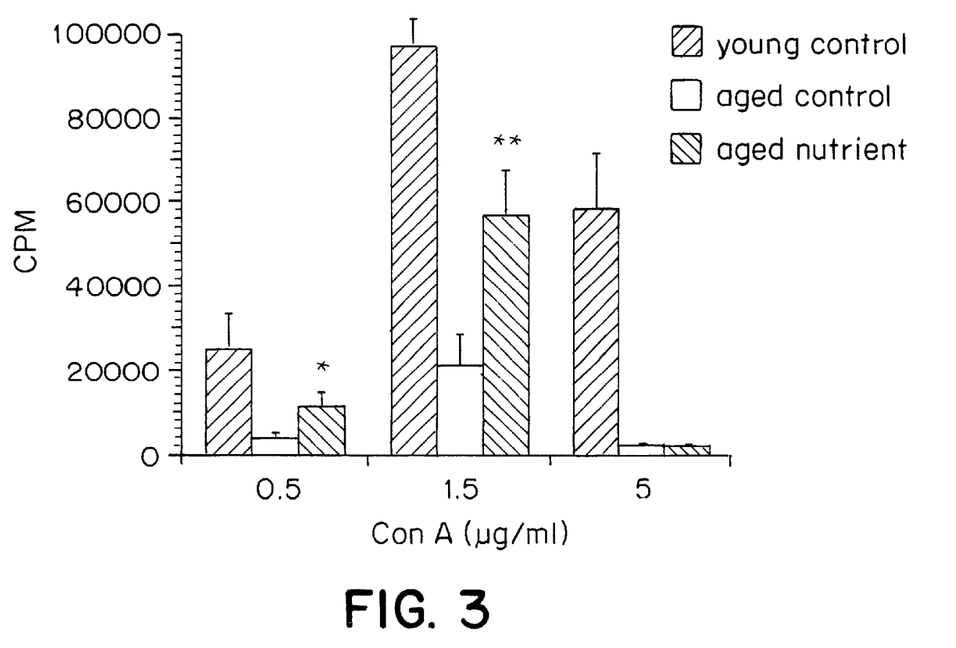
FIG. 3 illustrates the effect of Conacavalin A on splenocyte proliferation in cells isolated from young and aged mice not fed the nutrient mixture (young control and aged control, respectively) and aged mice fed the nutrient mixture (aged nutrient). $p<0.05$ (*); $p<0.01$ (**).
Figure 4:
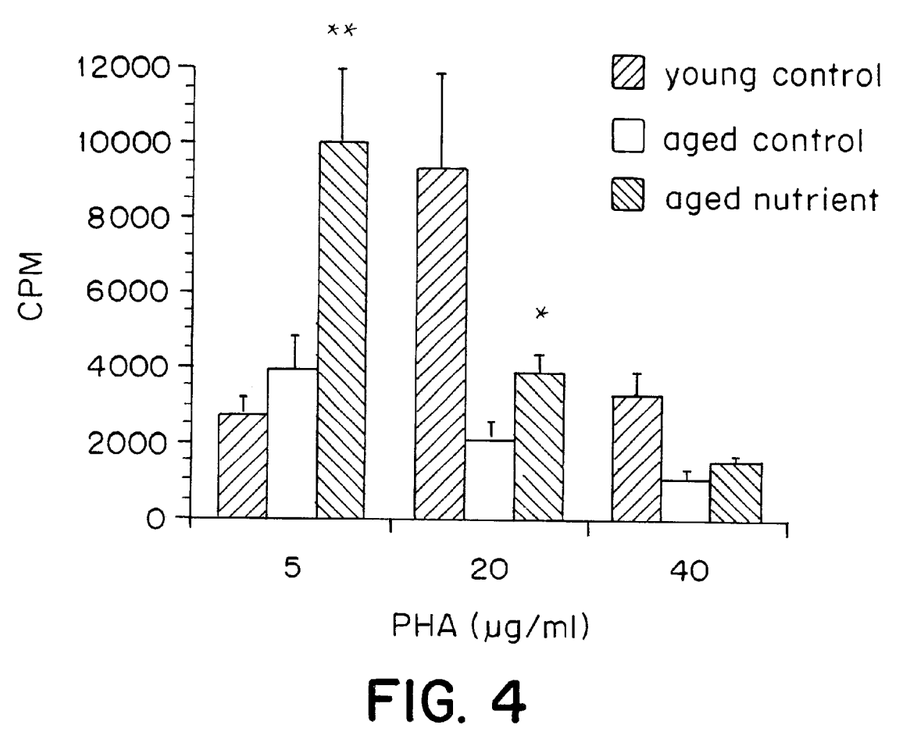
FIG. 4 illustrates the effect of phytohemagglutinin (PHA) on splenocyte proliferation in cells isolated from young and aged mice not fed the nutrient mixture (young control and aged control, respectively) and aged mice fed the nutrient mixture (aged nutrient). $p<0.05$ (*); $p<0.01$ (**).

FIGS. 3 and 4 show the proliferative response of splenocytes to varying concentrations of the T cell mitogens ConA and PHA, respectively. Values are expressed as the mean ±SEM for twelve individual determinations. A proliferative response was depicted as the counts per minute (CPM) in in vitro assays as described in Example 1.

Aged mice fed the control diet had a significantly lower proliferative response to the T cell mitogens ConA (FIG. 3) and PHA (FIG. 4) compared to young mice fed the control diet. Whereas the proliferative response in splenocytes isolated from aged mice fed a diet supplemented with the nutrient mixture was significantly greater than the proliferative response of splenocytes isolated from aged mice fed a control diet (FIGS. 3 and 4). An improvement in in vitro proliferation response of splenocytes to T-cell mitogens indicates an improvement (Beharka, A., et al., *Methods in Enzymology* 282:247–263 (1997), the teachings of which are hereby incorporated by reference in their entirety).

These in vitro and in vivo data show that the nutrient mixture can significantly improve T cell-mediated function in the aged mice. T cell-mediated functions can be functions that are dependent on physiological properties of T-cells, for example, the ability of T-cells to proliferate in response to T-cell mitogens, to produce cytokines, the ability to fight viral infections, the ability to fight bacterial infections, or the ability to attack or fight tumors. ("Fundamental Immunology", ed. W. E. Paul, Raven Press, NY (1989), the teachings of which are hereby incorporated by reference in their entirety). The mouse is an excellent model system for evaluating the effects of nutrients on immune responses in mammals, including humans. For example, vitamin E supplementation to old C576/6NCrlBr mice increased T cell function, vitamin E supplementation to the elderly human improved similar immunological responses (e.g. T-cell mediated funtion) (Meydani, et al., *Mech. Aging and Develop.* 34:191–201 (1986); Meydani, S. N., et al., *Am. J. Clin. Nutri.* 53:1275–1280 (1991), the teachings of both of which are hereby incorporated by reference in their entirety). Thus, these data strongly suggest that supplementing humans with the nutrient mixture of the invention can significantly improve immune responses in humans.

T cell-mediated function decreases with aging and contributes to the increased incidence of infectious and neoplastic diseases in the aged mammal. Thus, aged mammals can benefit from consumption of this nutrient mixture to stimulate T-cell function thereby decreasing the incidence and severity of infectious and neoplastic diseases in the aged mammal.

When a foreign invader, such as bacteria or a virus enters the body of a mammal (or human) the number to T-cells in the body proliferate to combat the foreign invader. When lymphocytes encounter the foreign invader, they proliferate, a phenomenon referred to as colonal expansion. Colonal expansion enables lymphocytes to duplicate thereby producing many similar lymphocytes in a short period of time to overcome the foreign invader and rid the foreign invader from the body. Thus, the ability of lymphocytes (e.g., T-lymphocytes) to proliferate in response to an antigen or a mitogen (e.g. ConA, PHA) in vitro was used to assess the ability of lymphocytes to proliferate. Lymphocytes obtained from an aging mammal, in particular T-lymphocytes, lose their ability to proliferate and, thus, the ability to combat infection in the aged mammal (e.g. rodents, primates, dogs, humans) is decreased. This decreased ability to combat infection is a characteristic of lymphocytes in aged mammals. Thus, the ability of the nutrient mixture of the invention to improve the ability of T-lymphocytes to proliferate is a significant advantage for the elderly population to combat disease including, for example, infections and immune compromised states such as neoplastic disease.

Equivalents

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A dietary supplement, comprising:
 a) Vitamin B6;
 b) Vitamin E present in a range of between about 10 and about 267 milligrams per milligram of Vitamin B6; and
 c) conjugated linoleic acid present in a range of between about 17 milligrams and about 100 milligrams per milligram of Vitamin B6.

2. The dietary supplement of claim 1, further including:
 a) Vitamin C;
 b) folic acid;
 c) zinc;
 d) selenium;
 e) Vitamin D;
 f) copper;
 g) Vitamin B12; and
 h) glutathione.

3. The dietary supplement of claim 2, wherein:
 a) the amount of Vitamin C present is in a range of between about 17 milligrams and about 200 milligrams per milligram of Vitamin B6;
 b) the amount of folic acid present is in a range of between about 0.05 milligrams and about 0.2 milligrams per milligram of Vitamin B6;
 c) the amount of zinc present is in a range of between about 1.67 milligrams and about 10 milligrams per milligram of Vitamin B6;
 d) the amount of selenium present is in a range of between about 0.005 milligrams and about 0.02 milligrams per milligram of Vitamin B6;
 e) the amount of Vitamin D present is in a range of between about 0.0008 milligrams and about 0.005 milligrams per milligram of Vitamin B6;
 f) the amount of copper present is in a range of between about 0.00008 milligrams and about 0.0007 milligrams per milligram of Vitamin B6;
 g) the amount of Vitamin B12 present is in a range of between about 0.0002 milligrams and about 0.001 milligrams per milligram of Vitamin B6; and
 h) the amount of glutathione is in a range of between about 4 milligrams and about 33 milligrams per milligram of Vitamin 6.

4. A dietary supplement, comprising:
 a) Vitamin B6;
 b) Vitamin E present in a range of between about 60 and about 800 International Units; and
 c) conjugated linoleic acid present in a range of between about 17 milligrams and about 100 milligram per milligram of Vitamin B6.

5. The dietary supplement of claim 4, wherein the amount of Vitamin B6 present is in a range of between about 3 milligrams and about 6 milligrams.

6. The dietary supplement comprising:
 a) Vitamin E present in a range between about 60 and about 800 International Units;
 b) Vitamin B6 present in a range between about 3 milligrams and about 6 milligrams; and
 c) conjugated linoleic acid present in a range between about 100 milligrams and about 300 milligrams.

7. The dietary supplement of claim 6, wherein the dietary supplement further includes glutathione in an amount in a range of between about 25 milligrams and about 100 milligrams.

8. The dietary supplement of claim 7, further including:
 a) about 100–600 mg of Vitamin C;
 b) about 300–600 µg of folic acid;
 c) about 10–30 mg of zinc;
 d) about 30–60 µg of selenium;
 e) about 5–15 µg of Vitamin D;
 f) about 0.5–2 µg of copper; and
 g) about 1–3 µg of Vitamin B12.

9. A dietary supplement, comprising:
 a) about 60–800 IU of Vitamin E;
 b) about 3–6 mg of Vitamin B6;
 c) about 100–300 mg of conjugated linoleic acid; and
 d) about 25–100 mg of glutathione.

10. The method of stimulating the immune system of an individual, comprising the steps of:
 a) formulating the dietary supplement that includes Vitamin E, Vitamin B6 and conjugated linoleic acid; and
 b) administering the dietary supplement to the individual.

11. The method of claim 10, wherein the dietary supplement is administered to an individual that is in a range of between about 45 and about 65 years of age.

12. A method of claim 10, wherein the dietary supplement is administered to an individual that is greater than about 65 years of age.

13. The method of claim 10, wherein the dietary supplement further includes glutathione.

14. A method of stimulating proliferation of a lymphocyte, comprising the steps of:

a) formulating a dietary supplement that includes Vitamin E, Vitamin B6, and conjugated linoleic acid; and b) administering the dietary supplement to the lymphocyte.

15. The method of claim 14, wherein the lymphocyte is a T-cell lymphocyte.

16. The method of claim 14, wherein the dietary supplement further includes glutathione.

17. A method of stimulating the immune system of an individual, comprising the steps of:

a) formulating a dietary supplement that includes about 60–800 IU of Vitamin E; about 3–6 mg of Vitamin B6; and about 100–300 mg of conjugated linoleic acid; and b) administering the dietary supplement to the individual.

18. The method of claim 17, wherein the dietary supplement is administered to an individual that is middle-aged.

19. The method of claim 17, wherein the dietary supplement is administered to an individual that is elderly.

20. A method of stimulating the immune system of an individual, comprising the steps of:

a) formulating a dietary supplement that includes about 60–800 IU of Vitamin E; about 3–6 mg of Vitamin B6; about 100–300 mg of conjugated linoleic acid; and about 25–100 mg of glutathione; and b) administering the dietary supplement to the individual.

21. The method of claim 20, wherein The dietary supplement is administered to an individual that is middle-aged.

22. The method of claim 20, wherein the dietary supplement is administered to an individual that is elderly.

23. A method of stimulating the immune system of an individual, comprising the steps of:

a) formulating a dietary supplement comprising about 60–800 IU of Vitamin E; about 3–6 mg of Vitamin B6; about 100–300 mg of conjugated linoleic acid; about 25–100 mg of glutathione; about 100–600 mg of Vitamin C; about 300–600 µg of folic acid; about 10–30 mg of zinc; about 30–60 µg of selenium; about 5–15 µg of Vitamin D; about 0.5–2 µg of copper, and about 1–3 µg of Vitamin B12; and b) administering the dietary supplement to the individual.

24. The method of claim 23, wherein the dietary supplement is administered to an individual that is middle-aged.

25. The method of claim 23, wherein the dietary supplement is administered to an individual that is elderly.

26. A method of stimulating proliferation of a lymphocyte, comprising the steps of:

a) formulating a dietary supplement that includes about 60–800 IU of Vitamin E; about 3–6 mg of Vitamin B6; and about 100–300 mg of conjugated linoleic acid; and b) administering the dietary supplement to the lymphocyte.

27. The method of claim 26, wherein the dietary supplement is administered to a T-cell lymphocyte.

28. A method of stimulating proliferation of a lymphocyte, comprising the steps of:

a) formulating a dietary supplement that includes about 60–800 IU of Vitamin E; about 3–6 mg of Vitamin B6; about 100–300 mg of conjugated linoleic acid; and about 25–100 mg of glutathione; and b) administering the dietary supplement to the lymphocyte.

29. The method of claim 28, wherein the dietary supplement is administered to a T-cell lymphocyte.

30. A method of stimulating proliferation of a lymphocyte, comprising the steps of:

a) formulating a dietary supplement comprising about 60–800 IU of Vitamin E; about 3–6 mg of Vitamin B6; about 100–300 mg of conjugated linoleic acid; about 25–100 mg of glutathione; about 100–600 mg of Vitamin C; about 300–600 µg of folic acid; about 10–30 mg of zinc; about 30–60 µg of selenium; about 5–15 µg of Vitamin D; about 0.5–2 µg of copper, and about 1–3 µg of Vitamin B12; and b) administering the dietary supplement to the lymphocyte.

31. The method of claim 30, wherein the lymphocyte is a T-cell lymphocyte.

* * * * *

UNITED STATES PATENT AND TRADEMARK OFFICE
CERTIFICATE OF CORRECTION

PATENT NO. : 6,642,259 B1
DATED : November 4, 2003
INVENTOR(S) : Simin Nikbin Meydani and Mohsen Meydani It is certified that error appears in the above-identified patent and that said Letters Patent is hereby corrected as shown below:

Column 12,
Line 15, please delete "Vitamin 6" and insert -- Vitamin B6 --.

Signed and Sealed this

Twenty-third Day of December, 2003

JAMES E. ROGAN
*Director of the United States Patent and Trademark Office*